E. A. HOWE.
AUTOMOBILE TIRE.
APPLICATION FILED FEB. 21, 1913.

1,079,175.

Patented Nov. 18, 1913.

Witnesses

Inventor
E. A. Howe
By
Attorneys

UNITED STATES PATENT OFFICE.

EDWIN A. HOWE, OF BANCROFT, IOWA.

AUTOMOBILE-TIRE.

1,079,175.  Specification of Letters Patent.  Patented Nov. 18, 1913.

Application filed February 21, 1913. Serial No. 749,989.

*To all whom it may concern:*

Be it known that I, EDWIN A. HOWE, a citizen of the United States, residing at Bancroft, in the county of Kossuth, State of Iowa, have invented certain new and useful Improvements in Automobile-Tires; and I do hereby declare the following to be a full, clear, and exact description of the invention, such as will enable others skilled in the art to which it appertains to make and use the same.

This invention relates to improvements in tires, and particularly to cushion tires.

One object of the invention is to provide a cushion tire as a whole, which can be easily applied to the ordinary automobile wheel rim.

Another object resides in the peculiar construction and arrangement of parts to produce resiliency and to protect the parts from dirt and dust.

Other objects and advantages will be apparent from the following description when taken in connection with the accompanying drawings.

Figure 1:
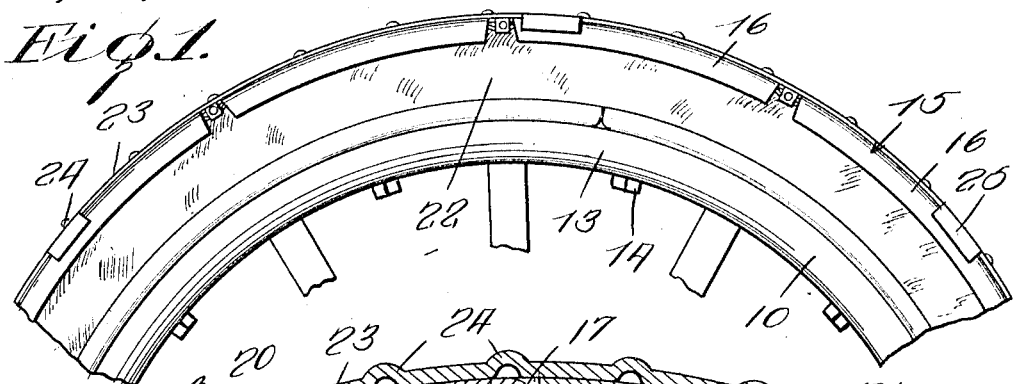
Figure 2:
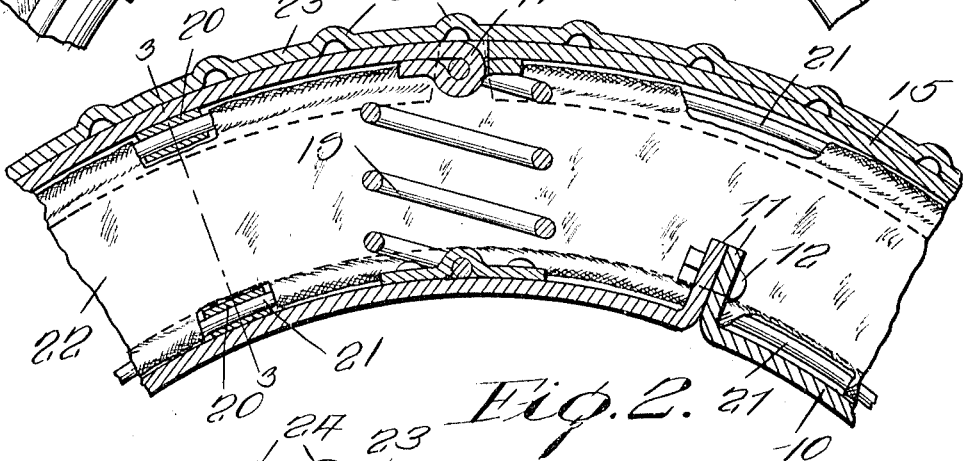
Figure 3:
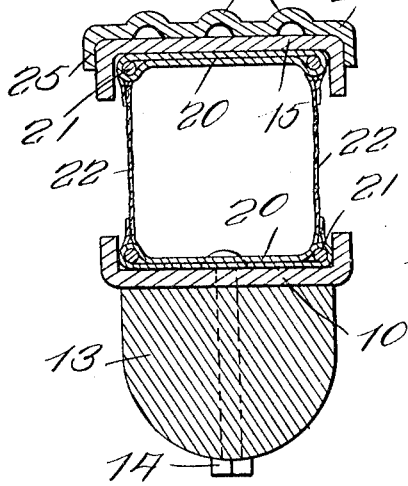
Figure 4:
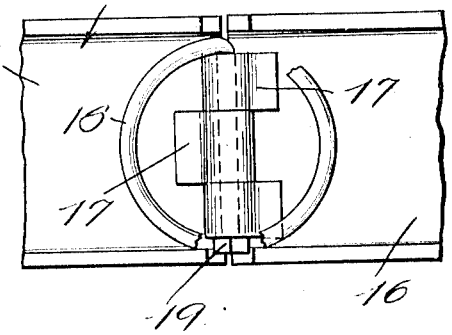

In the drawings: Figure 1 is an elevation of a portion of a tire made in accordance with my invention. Fig. 2 is a vertical longitudinal sectional view therethrough. Fig. 3 is a vertical transverse sectional view on the line 3—3 of Fig. 2 and Fig. 4 is a detail view of the connection of the outer rim.

Referring particularly to the accompanying drawings, 10 represents the inner or rim engaging band, which is formed preferably of two sections attached together, and formed with the upturned ends 11 which are secured together by means of the bolts 12, these sections being preferably in the form of channels, said sections being secured to the rim 13 by means of the bolts 14. Arranged outside of the rim engaging band 10 and concentric therewith is a band 15, this band being made up of a plurality of sections 16. Formed on the abutting ends of the sections 16 are the tongues 17 which are bent back on the sections to form loops, and are adapted to receive one end of a coil spring 18, the opposite end of which is bolted to the inner rim member 10. There are a plurality of these springs 18, which are arranged at the joints between the members 16. Thus a portion of the spring forms a part of the hinge, the free end of the spring being formed with threads to receive a nut 19. On the inner faces of the sections 16 and on the outer face of the inner band 10 are arranged loop members 20 through which are passed wire hoops 21, these hoops having secured thereto, by their marginal edges, the fabric guards 22, these being arranged on opposite sides of the tire and covering the spaces between inner rim 10 and the outer rim 15 to prevent dust and dirt entering between the rims. Mounted on the outer face of the rim 15 is a continuous metal band 23 provided with a plurality of points 24 to prevent skidding. The band 23 has flanges 25 on its edges for engagement with the sides of the outer rim 15 to prevent the same moving laterally on the said rim.

What is claimed is:

A cushion tire comprising a rim engaging band, a band arranged concentrically outward of the rim engaging band, said outer band being formed in sections, perforated lugs carried by the adjacent ends of the sections of the outer band, coil springs secured to the rim engaging band and having their opposite ends disposed through the perforated lugs to form hinges between the sections of the outer bands, and a tread member mounted on the outer rim.

In testimony whereof, I affix my signature, in presence of two witnesses.

EDWIN A. HOWE.

Witnesses:
C. M. C. WALTERS,
JAS. ALLSON.